US005223938A

United States Patent [19]

Mizutani et al.

[11] Patent Number: 5,223,938

[45] Date of Patent: Jun. 29, 1993

[54] IMAGE FORMING APPARATUS AND PROCESS CARTRIDGE THEREFOR

[75] Inventors: Morikazu Mizutani, Tokyo; Shigeyoshi Onoda, Yokohama; Isao Ikemoto, Kawasaki; Shinji Kanemitsu, Tokyo; Hajime Kitajima, Yokohama, all of Japan

[73] Assignee: Canon Kabushiki Kaisha, Tokyo, Japan

[21] Appl. No.: 812,856

[22] Filed: Dec. 23, 1991

Related U.S. Application Data

[63] Continuation of Ser. No. 434,537, Nov. 8, 1989, abandoned, which is a continuation of Ser. No. 36,810, Apr. 10, 1987, abandoned.

[30] Foreign Application Priority Data

Apr. 11, 1986 [JP] Japan .............................. 61-083932

[51] Int. Cl.[5] .............................................. H04N 1/21

[52] U.S. Cl. .................................... 358/296; 355/208

[58] Field of Search ................ 358/296, 298, 300, 208

[56] References Cited

U.S. PATENT DOCUMENTS

| | | | |
|---|---|---|---|
| 4,166,692 | 9/1979 | Okada et al. | 355/3 R |
| 4,470,689 | 9/1984 | Nomura et al. . | |
| 4,500,195 | 2/1985 | Hosono . | |
| 4,540,268 | 9/1985 | Toyono et al. . | |
| 4,540,269 | 9/1985 | Nishiyama | 340/689 |
| 4,551,000 | 11/1985 | Kanemitsu et al. . | |
| 4,563,694 | 1/1986 | Ohkubo et al. . | |
| 4,598,993 | 7/1986 | Mizutani et al. . | |
| 4,657,372 | 4/1987 | Ikeda et al. | 355/3 BE |

FOREIGN PATENT DOCUMENTS 6076360 3/1983 Japan .

OTHER PUBLICATIONS

Patent Abstracts of Japan, vol. 6, No. 5 (P-97) [883], Jan. 13, 1982, with respect to Japanese Patent Doc. No. 56132361 (Oct. 16, 1981).

Patent Abstracts of Japan, vol. 10, No. 22, (P-424) [2079], Jan. 28, 1986, with respect to Japanese Patent Doc. No. 60176057 (Sep. 9, 1985).

Patent Abstracts of Japan, vol. 6, No. 104 (P-122) [982], Jun. 15, 1982, with respect to Japanese Patent Doc. No. 5734572 (Feb. 24, 1982).

Patent Abstracts of Japan, vol. 8, No. 165 (P-291) [1602], Jul. 31, 1984, with respect to Japanese Patent Doc. No. 5961861 (Apr. 9, 1984).

Patent Abstracts of Japan, vol. 10, No. 305 (P-507) [2361], Oct. 17, 1986, with respect to Japanese Patent Doc. No. 61120177 (Jun. 7, 1986).

Patent Abstracts of Japan, vol. 8, No. 165 (P-291) [1602], Jul. 31, 1984, with respect to Japanese Patent Doc. No. 5961850 (Sep. 4, 1984).

*Primary Examiner*—Lincoln Donovan

*Attorney, Agent, or Firm*—Fitzpatrick, Cella, Harper & Scinto

[57] ABSTRACT

An image forming apparatus includes a first assembly, a second assembly movable relative to the first assembly to open and close the image forming apparatus, a photosensor provided in the first assembly, illuminating source provided in the second assembly, for illuminating an original to be copied, and light transmitting element for transmitting light emitted from the illuminating source in the first assembly to the photosensor in the second assembly.

32 Claims, 7 Drawing Sheets

IMAGE FORMING APPARATUS AND PROCESS CARTRIDGE THEREFOR

This application is a continuation of application Ser. No. 07/434,537 filed Nov. 8, 1989, now abandoned, which is a continuation of Ser. No. 036,810, filed Apr. 10, 1987, now abandoned.

FIELD OF THE INVENTION AND RELATED ART

The present invention relates to an image forming apparatus such as a copying apparatus and a laser beam printer, more particularly to an image forming apparatus wherein a quantity of illumination light for illuminating an original to be copied is detected, and/or wherein a disposable part or parts are assembled into a cartridge which is detachably mountable to a main assembly of the image forming apparatus. The present invention also relates to such a process cartridge.

Image forming machines are widely used in which disposable or consumable elements or materials are contained in a cartridge, which is replaced with a new cartridge when the service life thereof ends, and various proposals with respect to such machines have been made.

For example, U.S. Pat. Nos. 4,500,195; 4,551,000; 4,470,689; 4,598,993; 4,540,268; and 4,563,694, disclose easy-operation image forming apparatus wherein a process cartridge contains a photosensitive member on which an image is formed and another or other process means.

In such an apparatus, a structure is adopted with good advantages, wherein a frame of the main assembly which accommodates the process cartridge is hinged to the other frame of the main assembly, one of the frames being openable from the other to facilitate exchange of the cartridge and disposal of jammed paper.

However, in such an apparatus, the cartridge containing frame is relatively bulky, and therefore, it is difficult to open, or a large force is required for the opening or closing action. There is an increasing desire for reducing the size and weight of the cartridge containing frame.

Where the process cartridge contains at least a photosensitive member, a developing device for developing an image on the photosensitive member and a hopper containing a developer, it is required that the developer is kept within the hopper without being supplied to the developing device so that the developer does not scatter or does not deteriorate while during a new unused cartridge is being stored. In order to accomplish this, Japanese Laid-Open Utility Model Application No. 60-76360 proposes that a seal is used to partition the developing device and the hopper. When the developing device is used, the seal is removed, thus supplying the developer to the developing device.

However, such a process cartridge can be set into the main apparatus irrespective of whether the seal is retained or removed, and therefore, the process cartridge can be erroneously set thereinto with the seal not removed, resulting in malfunction of the image forming apparatus.

SUMMARY OF THE INVENTION

Accordingly, it is a principal object of the present invention to provide an image forming apparatus wherein a process-cartridge-containing frame is small in size and light in weight so that it can be easily opened or closed with respect to the other frame.

It is another object of the present invention to provide an image forming apparatus which is not easily influenced by noise and which can receive a light quantity signal with certainty.

It is a further object of the present invention to provide an image forming apparatus and a process cartridge wherein a malfunction resulting from setting into the main assembly a process cartridge with its developing device not supplied with a developer, can be surely prevented.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
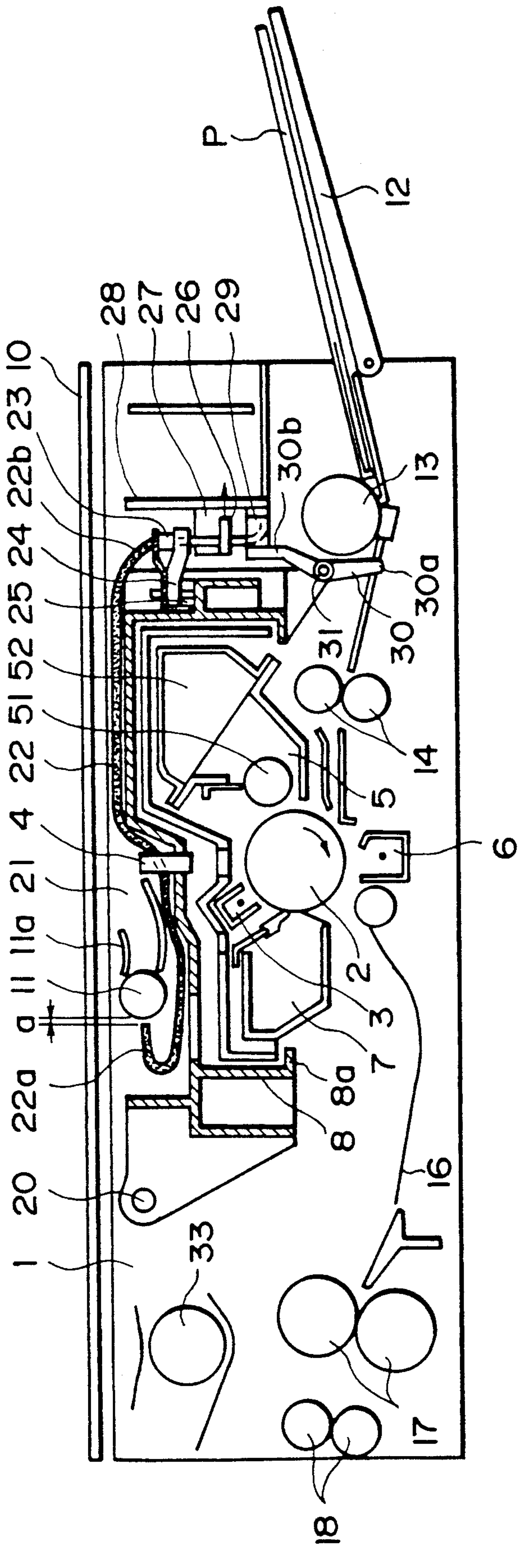
FIG. 1 is a sectional view of an image forming apparatus according to an embodiment of the present invention.
Figure 2:
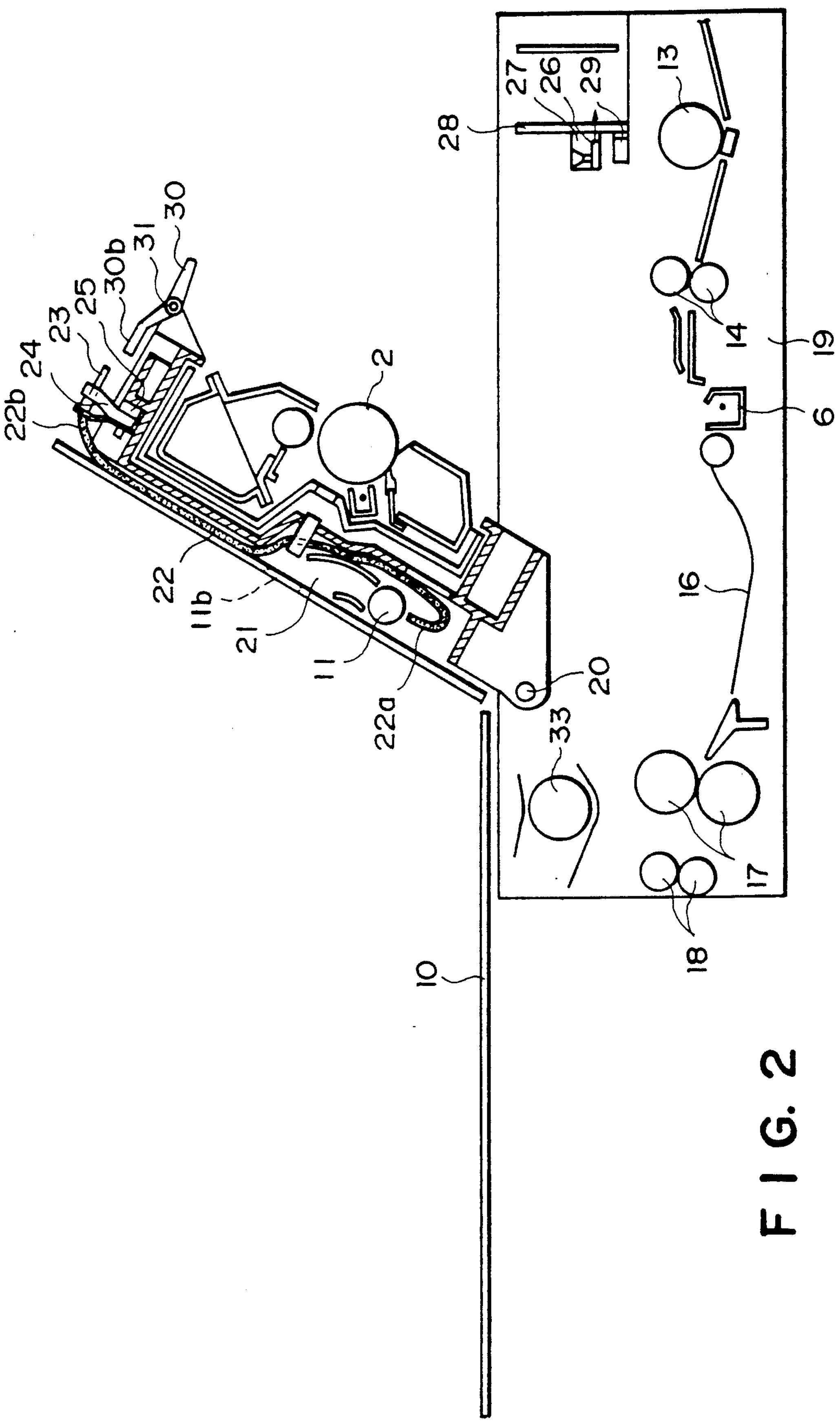
FIG. 2 is a sectional view of the apparatus shown in FIG. 1, wherein an upper frame is opened.

Referring to the drawings wherein like reference numerals have been used in several Figures to describe like elements, FIG. 1 illustrates an electrophotographic copying machine as an example of an image forming apparatus according to an embodiment of the present invention. As will be described hereinafter, the copying machine is openable. FIG. 1 shows the machine when it is closed, while FIG. 2 shows it when it is opened.

The image forming apparatus comprises a main assembly 1 which consists of a first frame 19 and a second frame 21 which are hinged by a hinge 20 so that the second frame is rotatable about the hinge 20 to open the machine.

The second frame 21 includes a slit **11*b* for allowing a photosensitive member 2 to be exposed to image light from an original to be copied, a fluorescent light 11 for illuminating the original to be copied, a reflecting shade 11*a*, a short-focus imaging element array 4 for forming an image of the original on the photosensitive member 2, a bundle 22 of optical fibers and a process cartridge accommodating portion 8*a* provided with guides for detachably accommodating a process cartridge 8. In FIGS. 1 and 2, the copying machine is illustrated as being loaded with the process cartridge 8 in accommodating portion 8*a***.

The photosensitive member 2 is contained in the process cartridge 8 in the form of a photosensitive drum, on which an electrostatic latent image is formed. The process cartridge 8 further contains around the periphery of the photosensitive drum 8, a corona discharger 3 for uniformly charging the photosensitive drum 8, a developing device 5 provided with a sleeve 51 for carrying a developer to develop the electrostatic latent image on the photosensitive drum 8, a hopper 52 for storing the developer which is to be supplied to the developing device 5 prior to start of using the process cartridge, and a cleaning device 7, arranged in the order named in the direction of rotation of the photosensitive drum 8. Those elements are contained as a unit in the process cartridge 8.

The first frame 19 and the second frame 21 are pivotable about a shaft 20 relative to each other to open or close the copying machine.

The first frame 19 includes an original carriage 10 for carrying an original to be copied and for reciprocally moving the original carried thereon in a predetermined stroke, a paper feeding tray 12 for supporting a transfer sheet or sheets P on which an image of the original is to be formed, a feeding roller 13 for separating and feeding one by one the transfer sheet P, a registration roller couple 14 for feeding the transfer sheet P to the photosensitive drum 8 in alignment with the developed image formed on the photosensitive drum 8, a transfer discharger 6 for transferring the developed image from the photosensitive drum 8 to the transfer sheet P, a conveying guide 16, an image fixing roller couple 17 for heat-or-pressure fixing the transferred toner image on the transfer sheet P into a permanent image, a discharge roller couple for discharging the transfer sheet now having the fixed image out of the main assembly. A fan 33 for preventing overheating of the apparatus, a control board 28 having electrostatic devices for controlling operation of the copying machine and a photosensor 26 for receiving light and producing an electric signal in response to the received light. Also, other elements associated with the above mentioned means are also contained.

A photo-interruptor 29 for detecting the sheet is fixed on the control board 28. A detecting lever 30 is rotatably supported on a pin 31 on the second frame 21. The lever 30 is rotated in the clockwise direction when its end 30*a* is pushed by a transfer sheet P, whereby the opposite end 30*b* intersects an optical path of the photointerruptor 29 to detect the sheet. In place of the photointerruptor 29, a microswitch may be used.

As will be understood from the foregoing, the process cartridge containing portion for accommodating the process cartridge which contains the photosensitive member and at least one of the other process means, and illuminating means for illuminating the original to be copied, are included in the second frame 21, whereas the fan 33 and the control board 28 are contained in the first frame 19. Because of this distribution of the elements, the second frame 21 may be made small in size and light in weight, whereby the load required when the machine is opened or closed can be reduced.

Next, the description will be made as to opening operation of the machine.

As shown in FIG. 2, the original carriage 10 is displaced out of its reciprocable stroke for the copying operation to such an extent that the top of the second frame 21 is completely exposed. If the original carriage 10 is placed at its home position shown in FIG. 1, the top of the second frame 21 is completely covered by the original carriage 10, so that the machine can not be opened in error. Additionally, the boundary between the first frame and the second frame is hidden, providing a better appearance.

When the illuminating source and the control board are contained in the different frames, there is provided an advantage, in addition to the above described advantages, that an adverse influence to the control board by heat produced by the illuminating source can be minimized. Correspondingly, however, there is a disadvantage. It is known that a quantity of light from the illuminating source is detected, and the quantity is controlled in response to an image density of the original. If the illuminating source and the control board are placed in the different frames, the length of a leading wire from a photosensor for detecting the quantity of light to the control board necessarily becomes larger, with the result that the detection is more influenced by electrical noises, by which the detection signal does not correctly represent the quantity of light received by the photosensor. Additionally, when the machine is opened and closed, the leading wire can be clamped or nipped unintentionally, and the wire is damaged. In the assembly of the machine, the wiring is cumbersome. In order to avoid the wiring between the first and second frames 19 and 21, it would be possible to provide connectors or relaying boards adjacent the boundary between the frames. Then, however, the contacts of the connectors or the relaying boards are deteriorated with repeated opening and closing of the apparatus, with the result of insufficient electrical contacts, whereby many electrical noises are taken up.

The embodiment illustrated in FIGS. 1 and 2 provides the solution to those problems. The optical fiber bundle 22 has an end 22*a* disposed adjacent the fluorescent tube 11 and spaced away therefrom by a distance a and the other end 22*b* which is fixed to an optical fiber supporting member 23 disposed at an opposite side in the second frame 21. The supporting member 23 is pivotably supported on the second frame 21 through a first lever 24 and a second lever 25. The photosensor 26 is effective to detect the quantity of light received thereby from the fluorescent tube 11 so as to control the quantity of light. The photosensor 26 is fixed on the control board 28 on the first frame 19 through a holder 27.

Figure 3:
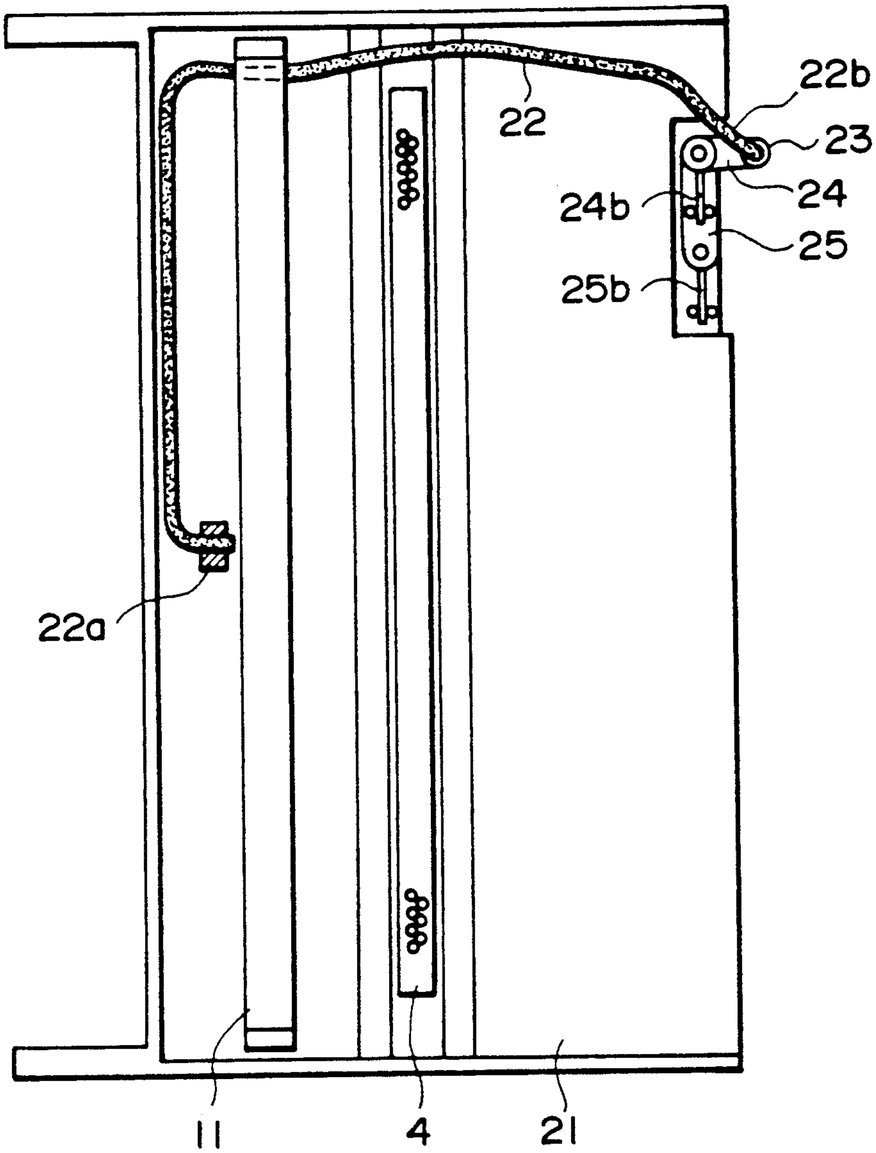
FIG. 3 is a top plan view of the apparatus of FIG. 2.

FIG. 3 is a top plan view of the second frame 21. It is preferable that the end 22*a* of the fiber is located adjacent the center of the length of the fluorescent tube 11 in consideration of variation in the quantity of light at the end portions of the tube 11. Particularly when the transfer sheet P is fed with its center aligned with a center of the apparatus, the measurement of the light quantity adjacent the center is satisfactory even for a small size transfer sheet, since the image exposure portion can be directly measured. Therefore, the measurement at the center is preferable.

As described, according to this embodiment of the present invention, the signal is optically guided to the first frame by the use of the bundle of light transmitting optical fibers, whereby, the signal transmission is not influenced by electrical noises. Thus, the correct signal representing the amount of light can be stably provided. Further, it is not necessary to pay particular attention to wires connecting the first and second frames. The contact for closing or opening the light transmitting path, is optical, and therefore, the contact is less influenced by noises.

In addition, since the photosensor is disposed on the control board, the possible noise between the photosensor and the control board can be avoided.

Figure 4:
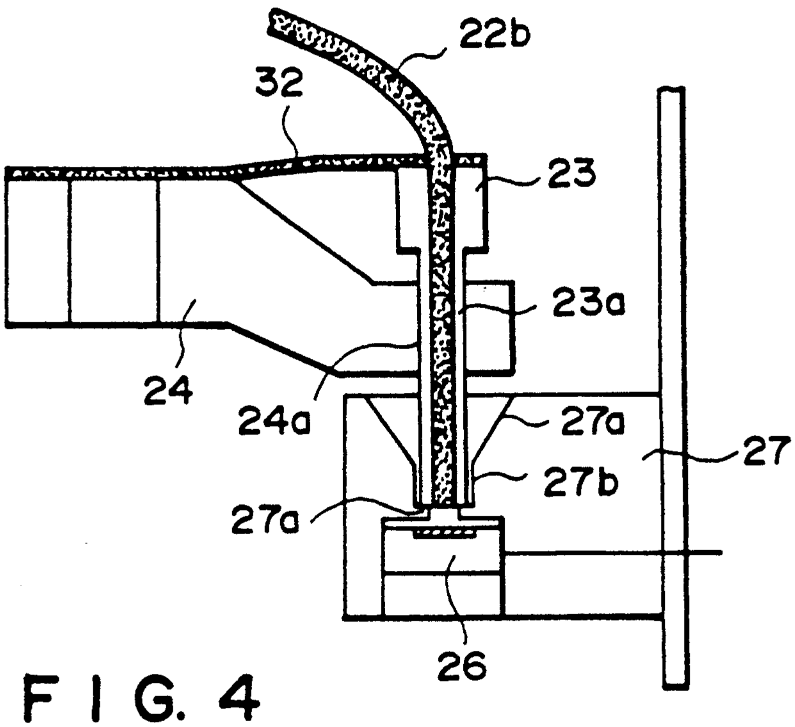
FIG. 4 is a sectional view illustrating an end of optical fiber and a sensor.
Figure 5:
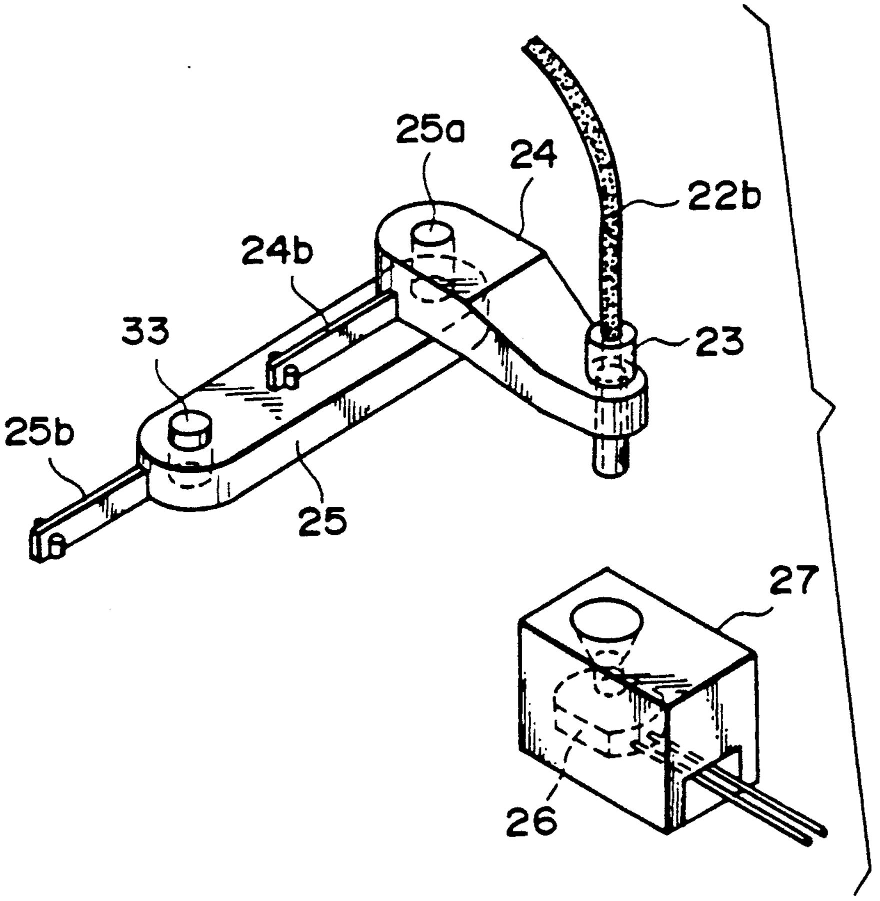
FIG. 5 is a perspective view illustrating the same.

Referring to FIG. 4, the description will be made with respect to the connection between an end 22*b* of the optical fibers and the photosensor 26. FIG. 5 is a perspective view of that portion.

The optical fiber supporting member 23 is supported for substantially vertical movement, on a guide 24*a* of a first pivotable lever 24. The member 23 is urged downwardly by a leaf spring.

The first lever 24 is rotatably supported on a pin 25*a* on a second pivotable lever 25. A resilient member 24*b* is integrally formed with the first pivotable lever 24 and is effective to retain the first pivotable lever 24 at an intermediate position. Thus, when the second frame is closed, the fiber end 22*b* is retained at the central position. Similarly, the second pivotable lever 25 is rotatably supported on the pin of the second frame 21, and is retained at the center by a resilient member 25*b*.

The sensor 26 is received by a sensor holder 27 when the second frame 21 is closed with respect to the first frame 19. The holder 27 is provided with a guiding portion 27*a* in the form of a funnel having a smaller cross-section toward the sensor 26 to guide the optical fiber supporting member 23 when the second frame 21 is closed to the first frame 19, an engaging portion 27*b* for engaging the fiber supporting member 23 to position the optical fiber 22*b* and the photosensor 26, and an abutting surface 27*c* to which an end surface of the optical fiber supporting member 23 is abutted by spring force provided by the leaf spring 32 so that a predetermined clearance is formed between the optical fiber 22 and the sensor 26.

According to the foregoing structure, when the image forming machine is closed, a predetermined clearance can be formed and maintained between the end surface 22*c* of the optical fibers 22 and the photosensor 26.

Figure 6:
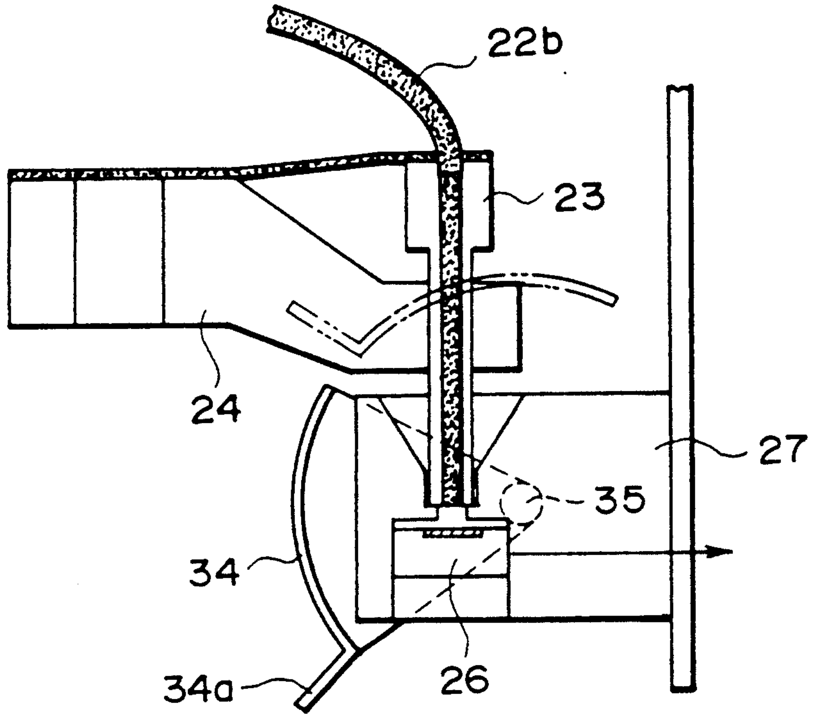
FIG. 6 is a sectional view illustrating a modification of FIG. 4 structure.

It is preferable that the holder 27 for the sensor 26 is provided with a shutter 34 as shown in FIG. 6 in order to prevent foreign matter from falling into the guiding portion 27*a* and to prevent dust from being accumulated therein. The shutter 34 is rotatably supported on a pin 35 mounted in a vertical wall of the holder 27, and is normally urged in a clockwise direction by an unshown urging means. When the copying machine is closed, an end portion 34*a* of the shutter 34 is pushed down by a member fixed to the second frame 21, so that the shutter 34 is rotated and takes a position shown by solid lines in FIG. 6. In this position, the shutter 34 does not obstruct the engagement between the holder 27 and the optical fiber supporting member 23. When the copying machine is opened by moving the second frame 21 upward, the shutter 34 rotates in the clockwise direction by the urging means to take the position indicated by chain lines in FIG. 6 so as to cover the holder 27 thereabove. By this, the top opening of the holder 27 is covered, whereby the light quantity signal can be stably provided for a long period of time.

Another embodiment of the present invention will now be described.

Figure 7:
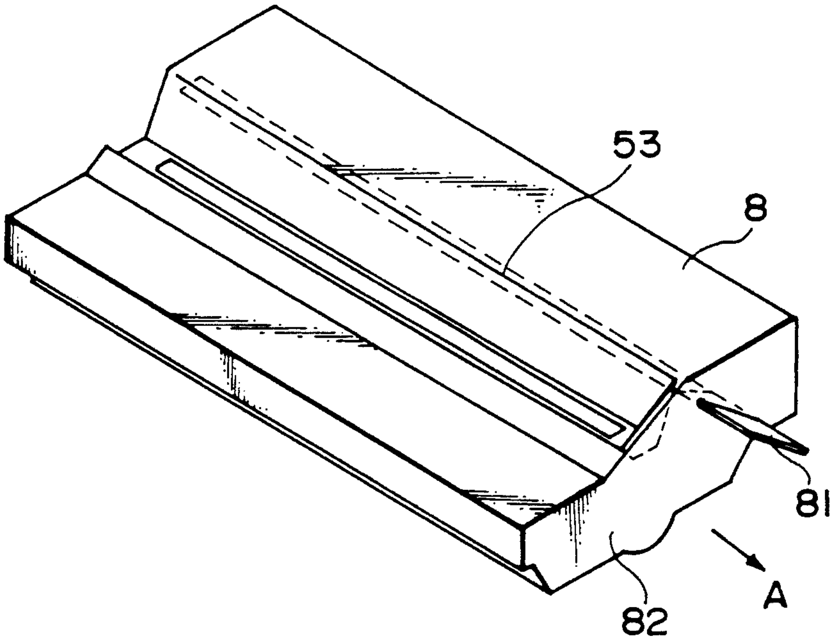
FIG. 7 is a perspective view of a process cartridge usable with an image forming apparatus according to the present invention, wherein no developer is supplied to a developing device.

Referring to FIG. 7, there is shown a process cartridge which is usable with the image forming apparatus described hereinbefore. The process cartridge has a developing device, which is not loaded with a developer in FIG. 7. The internal structure of the process cartridge is substantially the same as those shown in FIGS. 1 and 2.

The process cartridge includes a hopper 52, and a sealing member 53 is mounted to partition the hopper 52 and the developing device 5. By removing the sealing member 53 from the process cartridge, the developer contained in the hopper 52 is supplied into the developing device 5, and the supplied developer is carried on the sleeve 51 of the developing device 5.

A grip 81 made of a resin material is fixed to the seal 53 in the manner that when the grip 81 is pulled in the direction of an arrow A, the seal member 53 is peeled off and is removed from the process cartridge. The grip 81 is most projected from a lateral surface 82 of the process cartridge.

Figure 9:
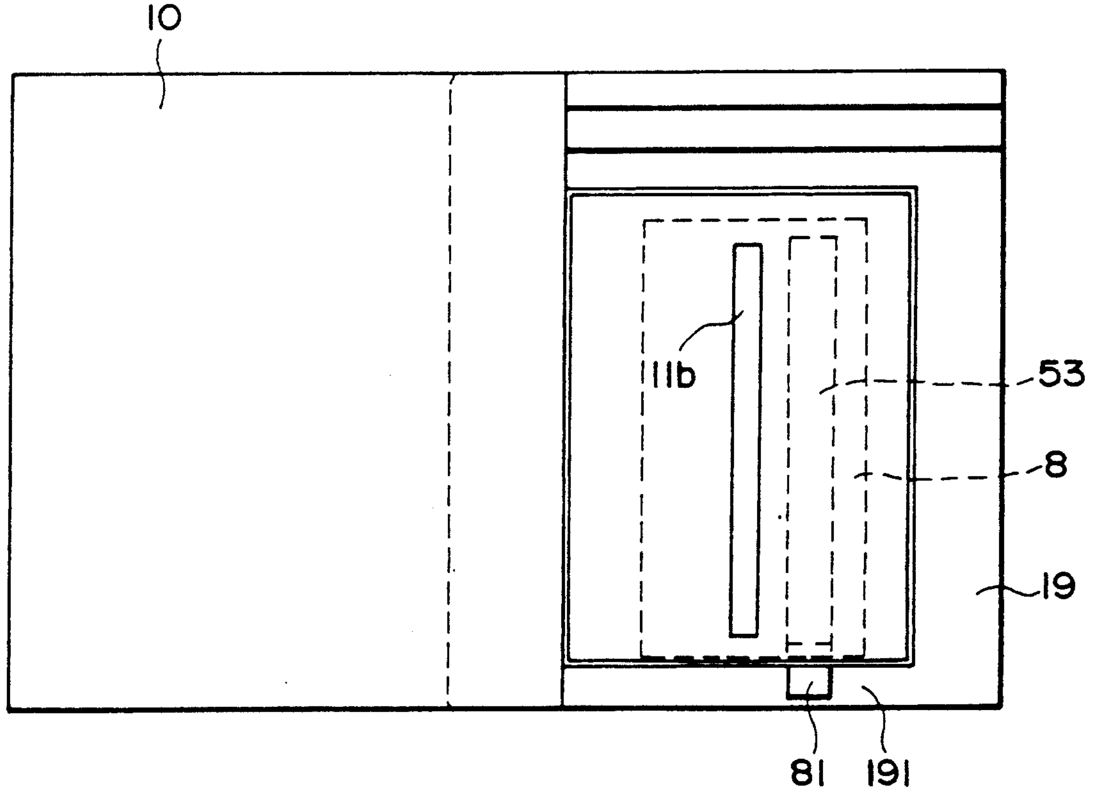
FIG. 9 is a top plan view of the image forming apparatus.
Figure 8:
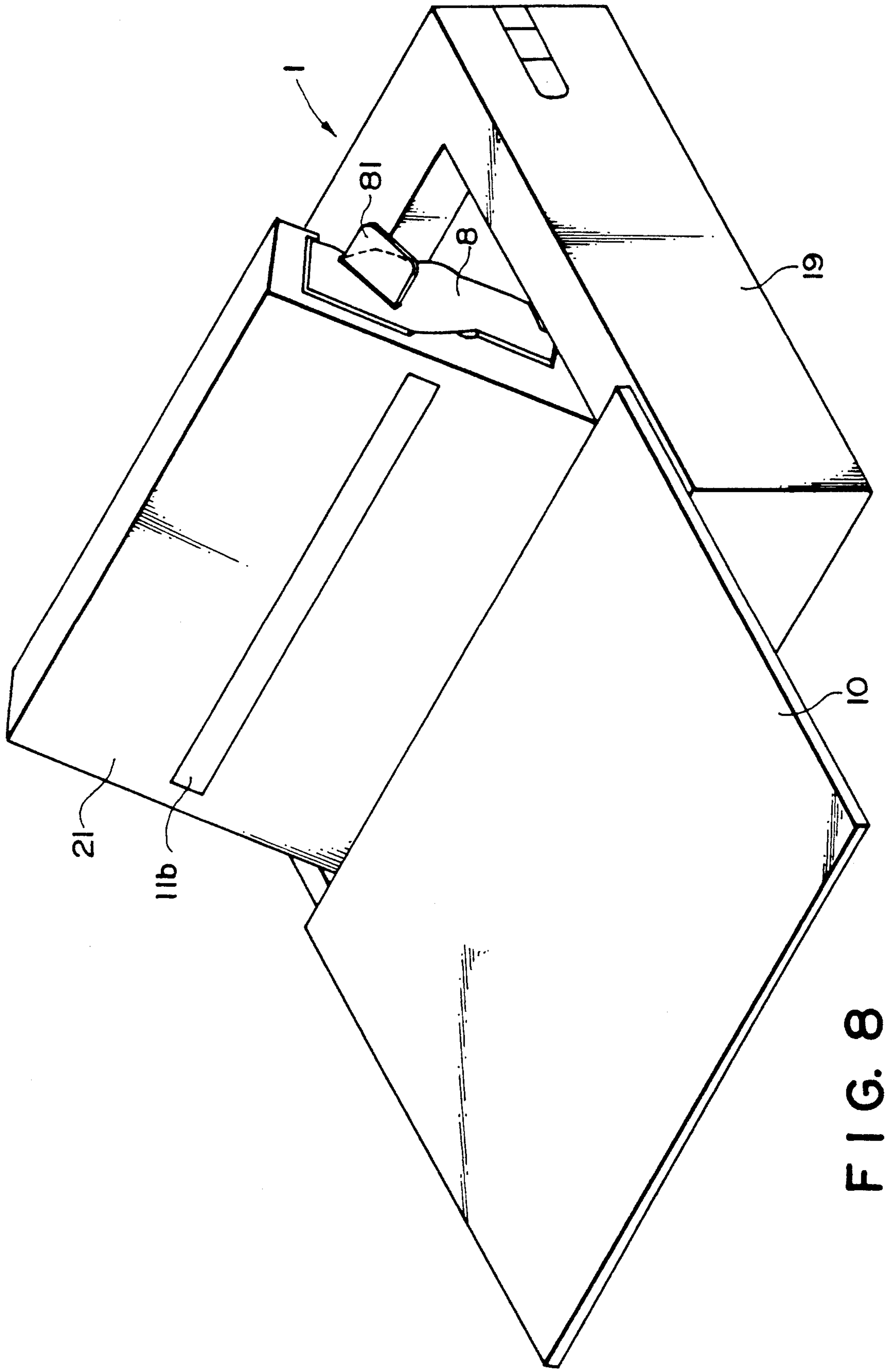
FIG. 8 is a perspective view of an image forming apparatus wherein a sealed process cartridge is mounted into a frame.

FIG. 8 is a perspective view illustrating the process cartridge mounted in the image forming apparatus. In this Figure, the process cartridge is set in the second frame 21 without the sealing member 53 being removed. If the user attempts to close the second frame 21 toward the first frame 19, the grip 81 abuts a top surface 191 of the first frame 19, since the grip 81 is sufficiently projected from the lateral surface 82 of the process cartridge, as best seen in FIG. 9, whereby the second frame 21 can not be completely closed to the first frame 19. Therefore, even if the process cartridge whose developing device 5 is not yet supplied by the developer, the copying machine cannot be closed. Thus, erroneous copying operation can be positively prevented.

When the process cartridge, after being deprived of the sealing member 53 and being set in the second frame, does not have anything that is engaged to the top surface of the first frame 191, so that the second frame 21 can be closed to the first frame 19, and the copying operation can be performed without error.

As will be understood from the foregoing, the possible erroneous printing operation can be prevented which may otherwise result from the process cartridge having the developing device not loaded with the developer being set in the apparatus.

The present invention covers a modification by combining parts of the embodiments disclosed in this specification.

While the invention has been described with reference to the structures disclosed herein, it is not confined to the details set forth and this application is intended to cover such modifications or changes as may come within the purposes of the improvements or the scope of the following claims.

We claim:

1. An image forming apparatus, comprising:

a first assembly;

a second assembly having illuminating means for illuminating an original and a photosensitive member for being exposed to light from the original, said second assembly being movable relative to said first assembly along a line corresponding to a passage for a recording material to open and close the image forming apparatus;

a photosensor in said first assembly, for detecting a quantity of light from said illuminating means, wherein said photosensor detects an amount of light from said illuminating means, in response to which the amount of light from said illuminating means is controlled; and light transmitting means for establishing an optical path from said illuminating means to said photosensor when said apparatus is closed.

2. An apparatus according to claim 1, wherein said light transmitting means includes optical fibers mounted in said second assembly.

3. An apparatus according to claim 1, wherein said second assembly includes a portion for detachably accommodating a process cartridge which contains a photosensitive member and at least one other process means.

4. An apparatus according to claim 3, wherein said first assembly includes a reciprocable original carriage for carrying the original.

5. An apparatus according to claim 1, wherein said first assembly includes a board having electrostatic elements for controlling said iamge forming apparatus, and said photosensor is mounted on the board.

6. An image forming apparatus, comprising:

a first assembly;

a second assembly movable relative to said first assembly to open and close said image forming apparatus;

illuminating means, provided in said second assembly for illuminating an original to be copied;

a photosensor, provided in said first assembly, for detecting an amount of light of said second assembly, wherein said photosensor detects an amount of light from said illuminating means, in response to which the amount of light from said illuminating means is controlled;

optical fiber means for transmitting light emitted from said illuminating means in said second assembly to said photosensor in said first assembly; and a guide portion for guiding said optical fiber means to establish a light transmitting path from said optical fiber means to said photosensor when said apparatus is closed, wherein when said assembly is opened, the light transmitting path is disestablished.

7. An apparatus according to claim 6, wherein said connecting portion is provided in said first assembly, and is engaged with and disengaged from an end of said light transmitting member in association with closing and opening of said apparatus by the relative movement between said first and second frames.

8. An apparatus according to claim 7, wherein said end of said light transmitting member is supported by a supporting member.

9. An apparatus according to claim 7, wherein said end of said light transmitting member is pivotable with respect to said second assembly.

10. An apparatus according to claim 9, wherein said connecting portion defines an opening having a cross-section becoming gradually smaller toward said photosensor.

11. An apparatus according to claim 7, wherein light emitted form said transparent member is directly received by said photosensor.

12. An apparatus according to claim 6, further comprising a protection member for protecting that part of the light transmitting path which is opened when said apparatus is opened by the relative movement between said first and second frames.

13. An apparatus according to claim 12, wherein said protection member is movable in association with opening and closing of said apparatus by the relative movement between said first and second frames.

14. An apparatus according to claim 6, wherein said second assembly includes a portion for detachably accommodating a process cartridge which contains a photosensitive member and at least one other process means.

15. An apparatus according to claim 6, wherein said first assembly includes a reciprocable original carriage for carrying the original.

16. An apparatus according to claim 6, wherein said first assembly includes a board having electrostatic elements for controlling said image forming apparatus, and said photosensor is mounted on the board.

17. An image forming apparatus, comprising:

a first assembly;

a second assembly movable relative to said first assembly to open and close said apparatus, said second assembly being provided with a process cartridge accommodating portion for accommodating a process cartridge including at least developing means and a developer storage chamber for storing a developer to be supplied to said developing means, and wherein the process cartridge includes a partition member for partitioning the developing means and the storage chamber and a grip connected to the partition member to assist removal of the partition member, wherein when said process cartridge is accommodated in said second assembly without the developer supplied from the developer storage chamber to the developing means, said first assembly is engageable with the grip to prevent said apparatus from being closed by the relative movement between said first and second assemblies.

18. An apparatus according to claim 17, wherein said process cartirdge comprises a partition member for partitioning said developing means and the storage chamber, and wherein said apparatus is allowed to be closed by removing the partition member.

19. An apparatus according to claim 17, wherein the grip is most outwardly projected from a surface of the process cartridge, and the grip is engageable to a top surface of said first assembly to prevent said apparatus from being closed by the relative movement between said first and second frames.

20. An apparatus according to claim 17, wherein said apparatus is allowed to be closed, by removing the grip from said process cartridge.

21. A process cartridge, comprising:

an image bearing member for bearing an electrostatic latent image;

developing means for developing the electrostatic latent image formed on said iamge bearing member;

a storage chamber for storing a developer to be supplied to said developing means;

a partition member for partitioning said developing means and said storage chamber; and a grip, projected out of an outer casing of said process cartridge, for assisting removal of said partition member, wherein said cartridge is detachably mountable to an image forming aparatus comprising a first assembly and a second assembly movable relative to the first assembly, and wherein said cartridge is detachably mountable to the second assembly, wherein when said process cartridge is accommodated in said second assembly without the developer supplied from the developer storage chamber to the developing means, said grip prevents a closing movement of the second assembly relative to the first assembly by engagement of said grip with the first assembly.

22. A cartridge according to claim 21, further comprising charging means for electrically charging said image bearing member and cleaning means for removing the developer remaining on said image bearing member.

23. A cartridge according to claim 21, wherein the developer is supplied to said developing means by removing said partition member by removing said grip from said process cartridge.

24. An image forming apparatus, comprising:

a first assembly;

a second assembly movable relative to said first assembly to open and close the image forming apparatus;

a process cartridge provided with process means for forming an image and contained ins aid second assembly, said cartridge having a projection for switching between an inoperative state of said cartridge and an operative state of said cartridge and for engaging said first assembly to prevent said image forming apparatus from being closed by the relative movement between said first and second assemblies, when said cartridge is in the inoperative state and is accommodated in said second assembly.

25. An apparatus according to claim 24, wherein said cartridge includes developing means, and a container for containing a developer for the developing means, and wherein said projection is connected with a partition between said developing means and said container, wherein the developer in said container is supplied into said developing means by removing said projection from said cartridge.

26. An apparatus according to claim 25, wherein said projection is projected most outwardly from a lateral side of said cartridge.

27. An apparatus according to claim 24, wherein said projection is bendable.

28. An apparatus according to claim 27, wherein said projection is not bent in the first state.

29. An apparatus according to claim 27, wherein when said projection is bent, said second assembly is movable to close said apparatus.

30. An apparatus according to claim 25, wherein said cartridge is switched from the first state to the second state by bending the projection and by removing the projection from said cartridge.

31. An image forming apparatus, comprising:

a first assembly;

a second assembly movable relative to said first assembly to open and close said image forming apparatus;

illuminating means, provided ins aid second assembly for illuminating an original to be copied;

a photosensor, provided in said first assembly, for detecting an amount of light from said second assembly; and optical fiber means for transmitting light emitted from said illuminating means in said second assembly to said photosensor in said first assembly, wherein said photosensor detects an amount of light from said illuminating means, in response to which the amount of light from said illuminating means is controlled.

32. An apparatus according to claim 17, wherein said process cartridge contains a photosensitive member.

* * * * *

UNITED STATES PATENT AND TRADEMARK OFFICE

CERTIFICATE OF CORRECTION

PATENT NO. : 5,223,938

DATED : June 29, 1993

INVENTOR(S) : Morikazu Mizutani, et al.

It is certified that error appears in the above-indentified patent and that said Letters Patent is hereby corrected as shown below:

On title page,

AT [56] References Cited - at FOREIGN PATENT DOCUMENTS:

"6076360 3/1983 Japan" should read --60-76360 Japan 3/1983--.

COLUMN 1:

line 51, "during" should be deleted.

COLUMN 6:

line 25, "can not" should read --cannot--;
line 30, "When, the" should read --The--; and
line 33, "191" should read --19--.

COLUMN 7:

line 55, "form" should read --from--.

COLUMN 8:

line 49, "iamge" should read --image--;
line 58, "aparatus" should read --apparatus--.

UNITED STATES PATENT AND TRADEMARK OFFICE

CERTIFICATE OF CORRECTION

PATENT NO. 5,223,938 Page 2 of 2

DATED June 29, 1993

INVENTOR(S) Morikazu Mizutani, et al.

It is certified that error appears in the above-indentified patent and that said Letters Patent is hereby corrected as shown below:

COLUMN 9:

line 17, "ins aid" should read --in said--.

COLUMN 10:

line 11, "claim 25," should read --claim 24,--;
line 20, "ins aid" should read --in said--.

Signed and Sealed this

Twenty-fourth Day of May, 1994

Attest:

Bruce Lehman

BRUCE LEHMAN

*Attesting Officer* *Commissioner of Patents and Trademarks*